Oct. 6, 1925.  
T. R. DAVIS  
1,556,429  
METHOD OF PRODUCING CAST METAL WHEELS  
Filed Oct. 1, 1923  
3 Sheets-Sheet 1

Inventor  
Thomas R. Davis  
By Chamberlain & Newman  
Attorney

Oct. 6, 1925.
T. R. DAVIS
1,556,429
METHOD OF PRODUCING CAST METAL WHEELS
Filed Oct. 1, 1923
3 Sheets-Sheet 2
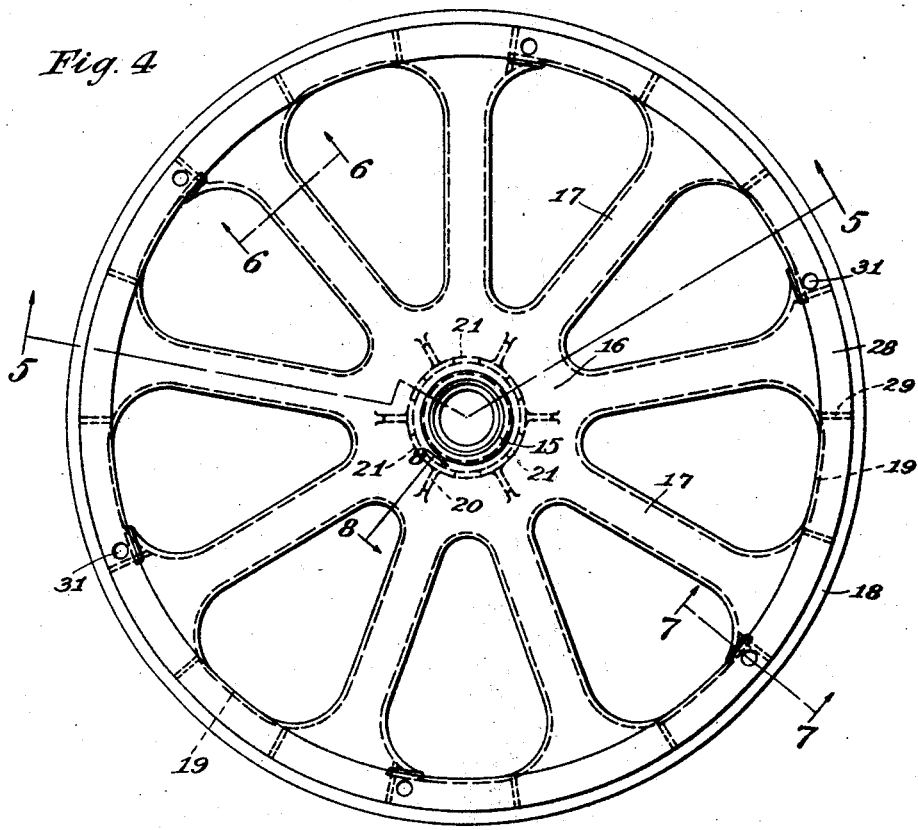
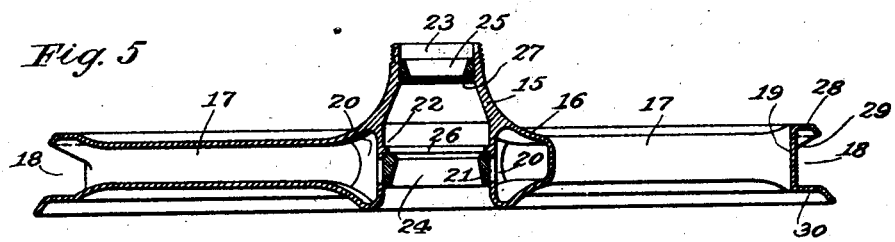
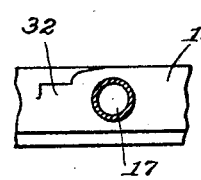
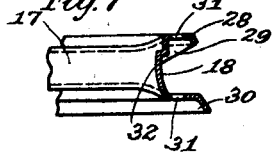
Inventor
Thomas R. Davis
By Chamberlain & Newman
Attorney Oct. 6, 1925.

T. R. DAVIS 1,556,429

METHOD OF PRODUCING CAST METAL WHEELS

Filed Oct. 1, 1923   3 Sheets-Sheet 3

Inventor
Thomas R. Davis

By Chamberlain & Newman
Attorneys

Patented Oct. 6, 1925.

1,556,429

UNITED STATES PATENT OFFICE.

THOMAS R. DAVIS, OF FAIRFIELD, CONNECTICUT.

METHOD OF PRODUCING CAST-METAL WHEELS.

Application filed October 1, 1923. Serial No. 665,780.

*To all whom it may concern:*

Be it known that THOMAS R. DAVIS, a citizen of the United States, and resident of Fairfield, in the county of Fairfield and State of Connecticut, has invented certain new and useful Improvements in Methods of Producing Cast-Metal Wheels, of which the following is a specification.

This invention relates to an improved method of producing wheels, and particularly automobile wheels having hollow spokes and formed of a one-piece casting, preferably of malleable iron.

An object is to provide a method by means of which such wheels may be produced in a reliable and uniform manner, with an even distribution of the metal so arranged that weak spots or unevenness in the thickness of the walls of the structure will be substantially eliminated. To this end it is proposed to provide a core structure for producing the hollow of the spokes, and which will be so connected to the hub and rim core, that it will be accurately positioned and supported during the molding process, in such manner that it will not change or shift its position, and therefore the thickness of metal at each side of the spokes will be uniform.

A further object is to provide an improved method of supporting the core, both before it is placed in the molding flask, and during the molding process, and which will facilitate its formation and handling, and will accurately position the core within the mold. In the present embodiment, it is proposed to employ a metal ring surrounding and supporting the core at its rim and adapted to seat in a positioning and supporting portion of the flask provided therefor.

Another object is to so form the hub that the bearings may be supported therein in a manner to provide an accurate and reliable bearing support for the wheel. A further feature consists in the method of supporting the bearing ring to close up the openings in the hub produced by the connection of the hub portion of the core to the spoke portion.

With the above and other objects in view, an apparatus for carrying out the present embodiment of the invention is illustrated in the accompanying drawings, and this embodiment will be hereinafter more fully described with reference thereto, and the invention will be finally pointed out in the claims.

In the drawings:

Fig. 4 is a plan view of a wheel produced according to the improved method;

Fig. 5 is a sectional view thereof, taken along the line 5—5 of Fig. 4;

Fig. 6 is a detail sectional view through one of the spokes, and taken along the line 6—6 of Fig. 4;

Fig. 7 is a detail sectional view of the rim portion, taken along the line 7—7 of Fig. 4;

Fig. 8 is a detail sectional view of the hub portion, taken along the line 8—8 of Fig. 4;

Similar reference characters indicate corresponding parts throughout the several figures of the drawings.

Figure 1:
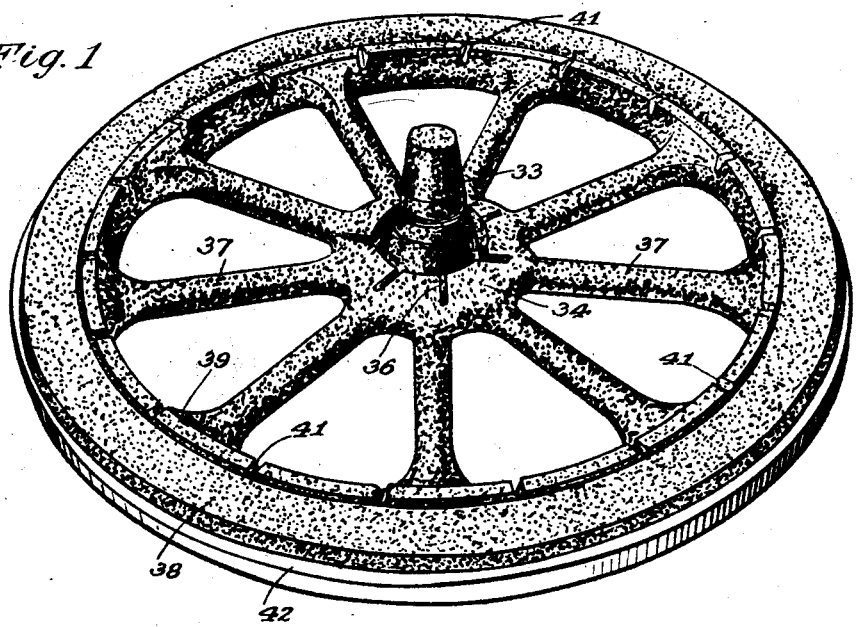
Fig. 1 is a perspective view showing the core employed in carrying out the present method.

The improved method, according to the present embodiment, consists in producing a one-piece cast metal wheel, having hollow spokes, and preferably of malleable iron. One type of wheel is shown in Figs. 4 to 8, and consists of a hub 15, an annular hollow portion 16 surrounding the hub, a series of hollow spokes 17 radiating from the portion 16 and extending to the rim 18, being flared adjacent the rim and the passage through each spoke opening into the rim, the flared portions of the spokes merging into the base portions 19 of the rim.

Reinforcing ribs 20 are provided in the annular portion 16 radially of the hub, and between these ribs the hub is provided with a series of holes 21. These holes are produced by the connection portions through which the core for producing the hollow in the spokes is supported by the hub core, and as will be presently more fully pointed out.

The hub is provided with a relatively large cylindrical portion 22 adjacent its inner end, and a reduced portion 23 adjacent the projected outer end, and within these portions the bearing rings 24 and 25 are seated. The portions 22 and 23 are machined to proper size for fitting the bearing rings, and adjacent the thrust receiving ends of the rings, annular lugs or shoulders 26 and 27 are provided to position and retain them.

The rim is provided with an outer flange 28 having an inwardly beveled edge and a series of reinforcing ribs 29 at its inner side, and an inner flange 30 having a beveled edge, said flange 30 being of larger diameter than the flange 28. Holes 31 are provided in the flanges for the tire retaining lug bolts, and adjacent these holes the rim is provided with lug abutting bosses 32.

Figure 2:
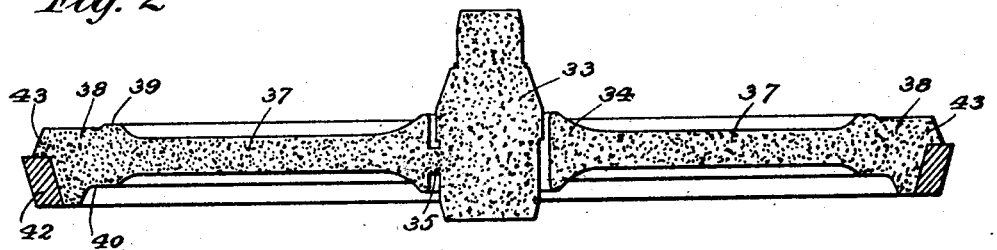
Fig. 2 is a sectional view of the core.
Figure 3:
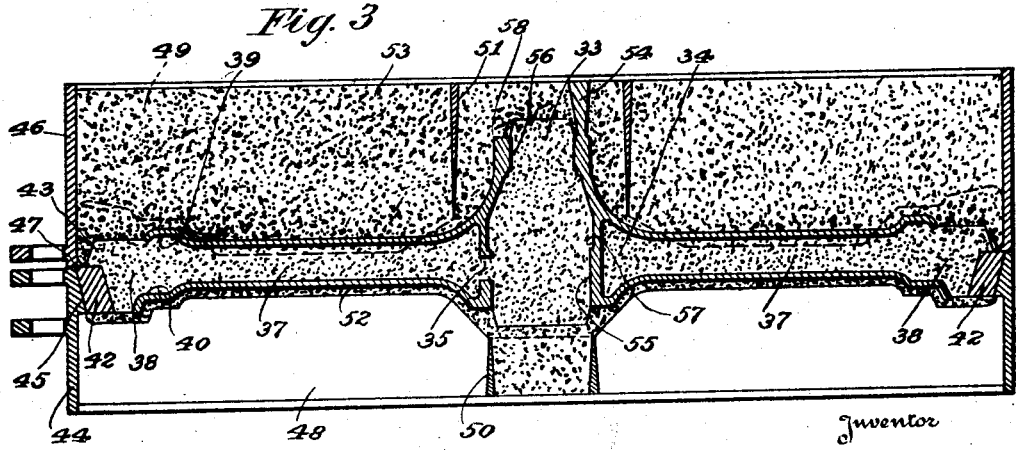
Fig. 3 is a sectional view of the mold flask, and showing the core inserted therein, and in sectional lines the cast wheel.

The improved method employed, according to the invention, and adapted to the particular type of wheel just described, is illustrated in Figs. 1 to 3, and consists in providing a one-piece core comprising a hub portion 33, an annular portion 34 surrounding the hub portion in spaced relation and adapted to produce the hollow of the portion 16 of the wheel, and being connected to the hub core portion by a series of spaced cylindrical connecting portions 35. The inner wall of the annular core portion 34 is provided with radial recesses 36 adapted to form the reinforcing ribs 20, these being disposed centrally between the connecting portions 35.

A series of spoke core portions 37 extend radially from the annular portion 34 to a circumferential rim core portion 38, shaped as at 39 and 40 to produce the inner surfaces of the flanges of the rim, and provided with a series of recesses 41 for producing the reinforcing ribs 29, and extending beyond the flange producing portions, where it is supported in a beveled metal ring 42, the core being shouldered, as at 43, to seat upon the upper surface of the ring.

The lower part or drag 44 of the mold flask is provided interiorly and adjacent its upper edge with a beveled seat 45 upon which the ring 42 seats, while the lower edge of the cope 46 has an inwardly extending flange 47 adapted to lockingly engage the upper surface of the ring, when the flask is closed. Both the drag and cope are respectively provided with a series of radially disposed reinforcing webs 48 and 49 extending between central cylindrical webs 50 and 51 and the outer walls of the flask, the edges of the webs being spaced below the surfaces of the sand in the flask when the same is filled. The drag, filled with sand, has the form of the inner exterior surface of the wheel impressed therein, as at 52, while the cope has the form of the outer exterior surface impressed therein, as at 53, these parts being then locked together with the core disposed between them. The mold is then poured in the usual manner, so that the metal flows through the space about the core. The gate is preferably provided at 54, extending to the upper end of the hub, this surplus metal being eventually cut off.

The support of the core by means of the metal ring 42, allows the same to be conveniently handled, and enables it to be produced in quantities and kept or stowed away until required, the core being formed of a fine sand, which when properly bonded and then baked, holds together in a manner to permit this. When the core is placed in the mold flask the seating of the ring upon the seat 45 securely supports and accurately positions the core at its outer edge, while the rub portion, which rests upon the sand in the drag, supports the spoke portion at the center through the integral connection portions 35, in a manner to prevent possible sagging or displacement. As a result the walls of the wheel are of uniform thickness and free of any weak or thin portions.

Upon removal of the completed wheel from the flask the gate is cut off, and the interior of the hub is machined to receive the bearing rings. It will be noted that the hub is provided at the bearing receiving portions with thickened annular portions 55 and 56 having shoulders 57 and 58 at their inner ends, these portions being machined inwardly to a point spaced from the shoulders, so that the before-mentioned annular lugs 26 and 27 are formed, and against which the bearing rings 24 and 25 are seated, the bearing ring 24 closing the holes produced in the hub by the connection portions 35 of the core. The holes 31 for the tire retaining lug bolts are then drilled in the rim, as is also the hole, not shown, for the valve stem, and the wheel is then complete.

Figures 9, 10:
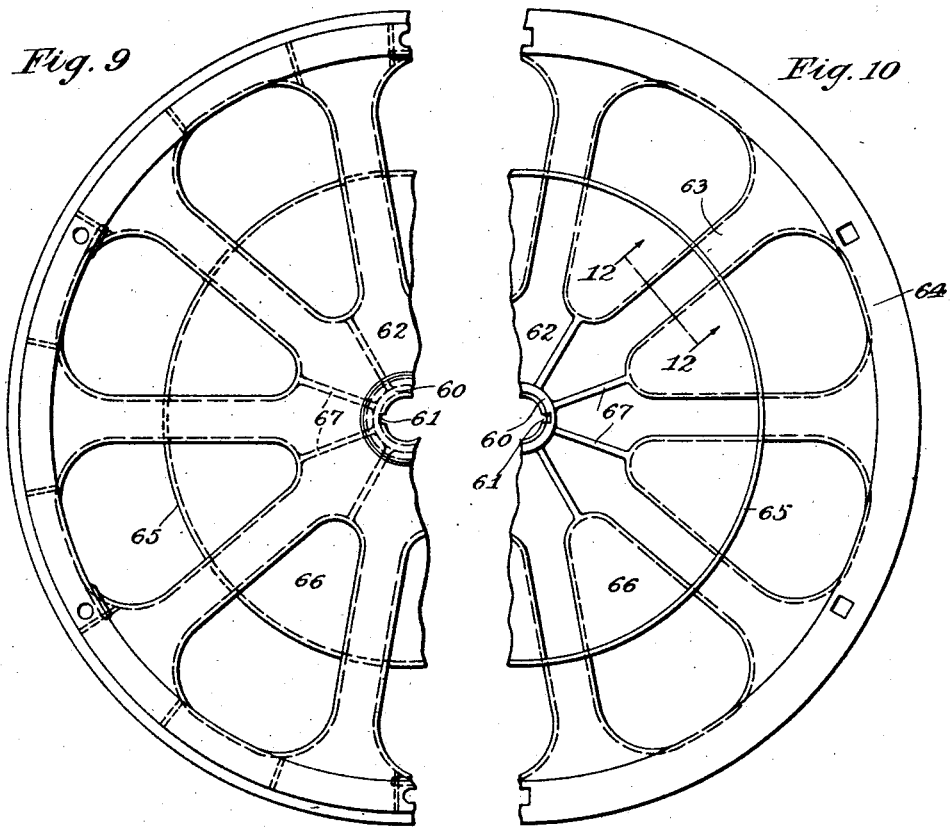
Fig. 9 is a front plan view of one half of a wheel, formed according to the improved method, and of a modified type, being provided with an integral brake drum.
Fig. 10 is a rear plan view of the same.
Figure 11:
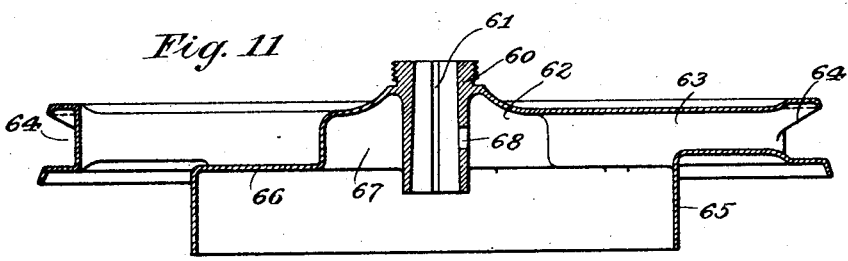
Fig. 11 is a sectional view thereof.
Figure 12:
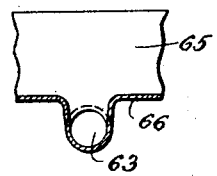
Fig. 12 is a detail sectional view, taken along the line 12—12 of Fig. 10.

In Figs. 9 and 10 there is illustrated a modified form of wheel, also adapted to be produced according to the improved method of the invention, this type being provided with an integral brake drum. The hub 60 is provided with a key-slot 61, and is adapted in use to be keyed to the driven axle of an automobile. A hollow annular portion 62 surrounds the hub and the spokes 63 extend in radial relation therefrom to the rim 64. The drum consists of a cylindrical band 65 spaced inwardly from the rim, and filler portions 66 extending between the band and the spokes, the hollows of the portion 62 and the spokes being open to the interior of the drum, so that the spokes are of U-shape cross-section within the drum, and are of circular cross-section between the drum and rim.

Reinforcing ribs 67 extend radially from the wall of the hub to the inner rounded ends of the filler portions 66, and between these ribs the hub is provided with holes 68 through which the spoke core is connected to the hub core.

It will be understood that in carrying out the improved method, in connection with the brake drum type of wheel, the mold form and core structure is altered to take care of the differences in design, the novel steps of the method, however, being the same.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:

1. In a mold for casting a one-piece hollow spoke wheel, a spoke core and a hub core, said spoke core being connected to and integral with said hub core at spaced points whereby holes are produced in the wall of the cast hub of said wheel.

2. In a mold for casting a one-piece hollow spoke wheel, a spoke core and a rim core connected to and integral with said spoke core.

3. In a mold for casting a one-piece hollow spoke wheel, a spoke core, a hub core, said spoke core being connected to and integral with said hub core at spaced points whereby holes are produced in the wall of the cast hub of said wheel, and a rim core connected to and integral with said spoke core.

4. In a mold for casting a one-piece hollow spoke wheel, a spoke core, and a removable metal ring surrounding said spoke core to support the same.

5. In a mold for casting a one-piece hollow spoke wheel, a spoke core, a rim core surrounding and integral with said spoke core, and a removable metal ring surrounding said spoke core to support the same.

6. In a mold for casting a one-piece hollow spoke wheel, an integral hub, spoke and rim core structure, and a removable metal ring surrounding the rim core portion of said structure to support the same.

7. In a mold for casting a one-piece hollow spoke wheel, a spoke core, a rim core surrounding and integral with said spoke core, a removable ring surrounding and supporting said rim core, and means for positioning and supporting said ring.

8. In a mold for casting a one-piece hollow spoke wheel, a rim core, a metal supporting ring against which said rim core is adapted to be molded and baked, and means whereby said ring can be removed from said rim core after metal to provide the wheel rim has been cast about said rim core.

9. A mold for casting a one-piece hollow spoke wheel, comprising a spoke core, a rim core surrounding and integral with said spoke core, a removable ring surrounding and supporting said rim core, means for positioning said ring in the drag of said mold, and inwardly protruding means at the bottom of the core of the mold, said protruding means abutting and bearing on the outside edge of said removable ring in such manner that the ring with its attached core will be held accurately in position in the drag until the wheel has been cast.

10. A mold for casting a one-piece hollow spoke wheel, consisting of a one-piece core including hub and spoke core portions.

11. A mold for casting a one-piece hollow spoke wheel, consisting of a one-piece core including hub, spoke and rim core portions.

12. A mold for casting a one-piece hollow spoke wheel, combining a hub core and a spoke core in communication with said hub core and adapted to provide openings through the hub of a cast wheel affording communication between the hollow spokes and the hollow of the hub of said wheel.

13. The method of forming one-piece cast wheels having hollow spokes, which consist in producing a hollow hub having openings in the walls thereof, providing hollow spokes communicating through said openings in the hub with the hollow of said hub, and forming a bearing receiving portion in said hub.

Signed at Fairfield, in the county of Fairfield and State of Connecticut this 28th day of September, A. D. 1923.

THOMAS R. DAVIS.